United States Patent
Hole et al.

(10) Patent No.: US 9,246,619 B2
(45) Date of Patent: *Jan. 26, 2016

(54) SYSTEM AND METHOD FOR UPLINK DATA TRANSFER IN DYNAMIC TIMESLOT REDUCTION

(71) Applicant: BLACKBERRY LIMITED, Waterloo (CA)

(72) Inventors: David Philip Hole, Southampton (GB); Werner Kreuzer, Balern (DE)

(73) Assignee: BlackBerry Limited, Waterloo, Ontario (CA)

( * ) Notice: Subject to any disclaimer, the term of this patent is extended or adjusted under 35 U.S.C. 154(b) by 275 days.

This patent is subject to a terminal disclaimer.

(21) Appl. No.: 13/873,877

(22) Filed: Apr. 30, 2013

(65) Prior Publication Data

US 2013/0242954 A1 Sep. 19, 2013

Related U.S. Application Data

(63) Continuation of application No. 12/862,529, filed on Aug. 24, 2010, now Pat. No. 8,509,198.

(51) Int. Cl.
*H04J 3/16* (2006.01)
*H04W 72/12* (2009.01)
*H04W 72/04* (2009.01)

(52) U.S. Cl.
CPC ......... *H04J 3/1694* (2013.01); *H04W 72/1257* (2013.01); *H04W 72/042* (2013.01)

(58) Field of Classification Search
CPC ............ H04J 3/1694; H04W 72/1257; H04W 72/042
USPC ......... 370/241, 252, 310, 315, 316, 319, 321, 370/322, 328, 329, 336, 345, 347, 348, 431, 370/442, 443; 455/403, 422.1, 450, 452.1
See application file for complete search history.

(56) References Cited

U.S. PATENT DOCUMENTS

| | | | |
|---|---|---|---|
| 5,940,399 | A | 8/1999 | Weizman |
| 8,565,197 | B2 | 10/2013 | Hole |
| 2006/0133295 | A1 | 6/2006 | Sakai et al. |
| 2006/0291395 | A1* | 12/2006 | Ketonen et al. ............... 370/236 |
| 2008/0019310 | A1 | 1/2008 | Sebire et al. |
| 2009/0168731 | A1 | 7/2009 | Zhang et al. |

(Continued)

OTHER PUBLICATIONS

PCT International Search Report and Written Opinion, PCT/EP2011/064293, Dec. 30, 2011.

(Continued)

*Primary Examiner* — Obaidul Huq
(74) *Attorney, Agent, or Firm* — Trop Pruner & Hu, P.C.

(57) ABSTRACT

A method for communicating with a network is presented. The method includes receiving an assignment of first timeslots for uplink communications, and receiving an instruction to reduce monitoring to a set of timeslots. The set of timeslots has a number of timeslots less than a number of timeslots to be monitored in accordance with the assignment. The method includes receiving a negative acknowledgement of a data block previously transmitted to the network, and, after receiving the instruction to reduce monitoring and the negative acknowledgement, transmitting a new data block to the network before retransmitting the data block previously transmitted to the network.

14 Claims, 8 Drawing Sheets

(56) References Cited

U.S. PATENT DOCUMENTS

2009/0275340 A1 11/2009 Axelsson et al.
2009/0279480 A1 11/2009 Rosenqvist et al.
2010/0075685 A1 3/2010 Axnas
2010/0210275 A1 8/2010 Navratil et al.
2011/0249568 A1 10/2011 Desai et al.

OTHER PUBLICATIONS

Nokia Corporation, Nokia Siemens Networks, Dynamic Timeslot Reduction, 3GPP TSG GERAN#41, Tdoc G2-090266, Valetta, Malta, Feb. 16-20, 2009.
Change Request, Title: Dynamic Timeslot Reduction, 3GPP TSG-GERAN WG2 Meeting #44, GP-092175, Sophia Antipolis, France, Nov. 16-20, 2009.
3rd Generation Partnership Project, Technical Specification Group GSM/EDGE Radio Access Network; General Packet Radio Service (GPRS); Mobile Station (MS)—Base Station System (BSS) Interface; Radio Link Control / Medium Access Control (RLC/MAC) Protocol, Release 10, 3GPP TS 44.060, V10.1.0, Jun. 2010.
Change Request, Title: Prioritisation of RLC Data Blocks when MS is in DTR Mode, 3GPP TSG-GERAN Meeting #47, GP-101416, Kunming, China, Aug. 30-Sep. 3, 2010.
Research in Motion UK Ltd., Dynamic Timeslot Reduction: Entering DTR With Outstanding Data Blocks, 3GPP TSG GERAN 47, Tdoc GP-101420, Kunming, China, Aug. 30-Sep. 3, 2010.
Change Request, Title: Entering DTR with Nacked Uplink Blocks, 3GPP TSG-GERAN Meeting #47, GP-101417, Kunming, China, Aug. 30-Sep. 3, 2010.
PCT International Preliminary Report on Patentability, PCT/EP2011/064293, Mar. 7, 2013.

* cited by examiner

SYSTEM AND METHOD FOR UPLINK DATA TRANSFER IN DYNAMIC TIMESLOT REDUCTION

CROSS-REFERENCE TO RELATED APPLICATIONS

This application is a continuation of U.S. application Ser. No. 12/862,529, filed on Aug. 24, 2010, and entitled, "SYSTEM AND METHOD FOR UPLINK DATA TRANSFER IN DYNAMIC TIMESLOT REDUCTION."

BACKGROUND

The present disclosure relates generally to data transmission protocols in mobile communication systems and, more specifically, to a system and method for uplink data transfer in dynamic timeslot reduction (DTR).

As used herein, the terms "mobile station" (MS), "user agent," and "user equipment" (UE) can refer to electronic devices such as mobile telephones, personal digital assistants (PDAs), handheld or laptop computers, and similar devices that have network communications capabilities. In some configurations, MS may refer to a mobile, wireless device. The terms may also refer to devices that have similar capabilities but that are not readily transportable, such as desktop computers, set-top boxes, or network nodes.

An MS may operate in a wireless communication network that provides for data communications. For example, the MS may operate in accordance with Global System for Mobile Communications (GSM) and General Packet Radio Service (GPRS) technologies. Today, such an MS may further operate in accordance with Enhanced Data rates for GSM Evolution (EDGE), Enhanced GPRS (EGPRS), Enhanced GPRS Phase 2 (EGPRS2), or GSM EDGE Radio Access Network (GERAN).

To communicate with a network, an MS is configured to use a media access control (MAC) protocol to determine the uplink (UL) and/or downlink (DL) communication resources available for use by the MS. GPRS, for example, uses a timeslot structure similar to that of GSM, but where timeslots are dynamically allocated to MSs both for uplink and downlink transmissions. To communicate with a GPRS network, therefore, an MS may be configured to have a multi-slot capability that enables the MS to use between one (1) and eight (8) timeslots per carrier for data transfer between the MS and network. Because uplink and downlink channels are reserved separately, various multi-slot resource configurations may be assigned in different directions in different communications networks.

In some cases, an MS may be allocated timeslots on dual carriers. A dual carrier 'assignment' comprises a set of timeslots assigned on two carriers. In the case of an uplink dual carrier assignment, the assignment includes the total set of timeslots on both carriers that may be used by the MS for uplink transmissions; in the case of a downlink dual carrier assignment, the assignment is the total set of timeslots on both carriers upon which the network may send data to the MS.

For any given radio block period, the network dynamically allocates resources and determines upon which downlink timeslots or uplink timeslots the MS may receive and/or transmit data. In basic transmission time intervals (BTTI), a given radio block period can include 4 TDMA frames with each TDMA frame including 8 timeslots. The allocation algorithm may be implementation dependent, but may take account of the MS's multislot class (the maximum number of timeslots on which the MS can transmit or receive, and the time required to switch from transmit to receive and vice versa), and may take account of the amount of data the network (e.g., a base station controller (BSC)) expects the MS to receive or transmit.

In some cases, reduced transmission time intervals (RTTI) are used for communication with an MS. RTTI are a modification to the above structure where, instead of a radio block being transmitted as four bursts with each block being sent in a particular timeslot over four TDMA frames, a radio block (containing essentially the same amount of information) is transmitted using two timeslots in two TDMA frames. This reduces the transmission time for a block and reduces the overall latency of the system. Accordingly, a "reduced radio block period" can be 2 TDMA frames (approximately 10 ms) compared with a basic radio block period, which can be 4 TDMA frames (approximately 20 ms).

In EGPRS systems, a radio block containing RLC data comprises a header and one or more RLC data blocks. The header (which is relatively robustly encoded) may be successfully decoded independent of the failure or success of decoding the one or more RLC data blocks. The header indicates the sequence number(s) of the RLC data blocks and (for downlink blocks) indicates the identity of the intended recipient MS. Provided that the header was decoded correctly, each of the RLC data blocks may be either successfully or unsuccessfully decoded. For example, in attempting to decode a radio block containing 2 RLC data blocks, an MS may decode the header and one of the RLC data blocks successfully, but may fail to decode the other RLC data block.

In a network, uplink allocations can be signaled to an MS using an uplink state flag (USF), which is a number between 0 and 7 (inclusive) that is signaled in downlink radio blocks. As part of the MS's uplink assignment, the MS is informed of which USF(s) on which timeslot(s) indicate an uplink allocation for that MS. USFs are generally included in the headers of downlink blocks. In the case of RTTI, USFs may be coded across radio blocks across four TDMA frames, for example, in the same manner as downlink BTTI radio blocks are sent (e.g., "BTTI USF mode") or (using two timeslots) across two TDMA frames (e.g., "RTTI USF mode").

In some communication standards, there are "m" timeslots assigned for reception and "n" timeslots assigned for transmission. Thus, for a multislot class type 1 MS, there may be Min(m, n, 2) reception and transmission timeslots with the same timeslot number. For a multislot class type 2 MS, there may be Min(m, n) reception and transmission timeslots with the same timeslot number. In the case of downlink dual carrier configurations, if timeslots with the same timeslot number are assigned on both channels, in calculating the value of m they may be counted as one timeslot. As a result, where both downlink and uplink timeslots are assigned, if assigned a single timeslot in one direction and one or more timeslots in the opposite direction, the timeslot number of the first timeslot may be the same as one of the timeslot(s) in the opposite direction. Similarly, if assigned two or more uplink timeslots and two or more downlink timeslots, at least two of the uplink and downlink timeslots may have a common timeslot number. As a result, in uplink+downlink assignments, the timeslots that may be monitored for USFs and downlink data blocks may be largely co-incident. In some networks, assignments and allocations are essentially under the control of the network (for example, the BSC).

During an ongoing packet data session, for example, an MS with an assigned downlink TBF (temporary block flow) can be required to monitor all downlink timeslots in the MS's assignment in case the network sends the MS data in any of the allocated downlink timeslots. Similarly, if an MS has an assigned uplink TBF, the MS may be required to monitor all timeslots on which the USF (uplink state flag) could be sent to dynamically allocate uplink resources. If an MS has both uplink and downlink TBFs, therefore, the MS must monitor as many relevant downlink timeslots as possible, taking into account any allocated uplink transmissions opportunities.

In the case that either the network or the MS has no data to send, and particularly when neither the network nor the MS has data to transmit, this monitoring activity results in significant wasted battery power in the MS. To minimize battery power consumption, the assigned resources (e.g., TBF) may be maintained, while the number of timeslots that the MS must monitor is reduced. This reduction in the number of timeslots being monitored can be referred to as DTR.

Using DTR, an MS (for example an MS operating in packet transfer mode (i.e. with assigned packet resources)) can reduce its battery consumption by reducing the set of timeslots that the MS monitors for downlink data and/or uplink allocations (as indicated by uplink state flags (USFs)). The MS may monitor only a single timeslot or, in RTTI, a single pair of timeslots per radio block period. As a result, the network may only transmit new data or USFs on timeslots that are actually monitored by the MS. Generally, for an MS in DTR, the transmission or reception of any new data (generally not retransmissions of previously transmitted data) causes the MS to leave DTR mode.

In various network configurations, there can be two particular mechanisms by which a network can cause an MS to enter DTR mode: option 1—by transmitting a PACKET UPLINK ACK/NACK (PUAN) control message containing DTR information to the MS, or option 2—by means of DTR information included within a Radio Link Control (RLC) data block transmitted to the MS.

In option 1, when a PUAN is used to instruct the MS to enter DTR, one of the conditions that should be met before the MS enters DTR is that no data block has been transmitted or received in the previous (max(BS_CV_MAX, 1)−1) block periods. Here, BS_CV_MAX may be a value indicative of the round trip time for data packets (e.g., packets sent on a Physical Downlink Channel (PDCH) or Packet Associated Control Channel (PACCH)) between the network (or that part of the network that processes data packets) and the MS. The value is made available by the network for use by connected MSs and may be broadcast in system information (SI), for example. A typical value of BS_CV_MAX is 6, corresponding to 6 radio block periods, or approximately 120 ms, for example.

BS_CV_MAX is a useful value as the MS can use the round trip time to determine whether Negative Acknowledgement (NACK) messages received from the network can safely be ignored. If, for example, a NACK that refers to a block that was very recently transmitted to the network by the MS is received from the network, the MS can use BS_CV_MAX to determine whether the NACK refers to the most recently transmitted block, or to a duplicate of the block that was transmitted earlier (such as when an MS retransmits a block to the network). If the most recent transmission of the block took place less than one round-trip time (i.e., BS_CV_MAX radio block periods) prior to reception of the NACK, then the NACK cannot refer to the most recently transmitted block because the network must have transmitted the NACK prior to receiving the most recent block (the NACK cannot be received in less time than BS_CV_MAX). Therefore, the NACK does not refer to the block that was most recently transmitted by the MS and the MS may choose to ignore the NACK because the network could have safely received the most recent transmission, which would make the NACK moot.

Generally, in the first option for causing the MS to enter DTR, the condition that no data block has been transmitted or received in the previous (max(BS_CV_MAX, 1)−1) block periods must be met at the time when the PUAN is received; if not, the DTR Information in the PUAN is ignored and the MS will not enter DTR.

In the second option, when using DTR information included within an RLC data block to cause the MS to enter DTR, the conditions for the MS entering DTR are 1) that any received poll has been responded to, 2) that V(R)=V(Q), and 3) that the block with sequence number V(R)−1 contain DTR information.

In this option, the parameters V(R), V(Q), V(N) relate to the RLC receive window in the MS that is associated with RLC data blocks. V(N) refers to an array of elements, each of which can take the value INVALID or RECEIVED. V(R) identifies the block sequence number (BSN) of the next expected block (i.e. one more than the highest BSN that has been seen or, in some cases, one higher than the highest BSN whose corresponding data block has been received correctly). V(Q) refers to the lowest BSN identifying a block that has not yet been received correctly. As such, when V(R)=V(Q), the next expected block is also the only one that has not yet been received correctly, meaning that all blocks with lower BSNs have been received correctly. As an example, in a particular block sequence, if an MS has received blocks 1, 2, 3, 4, 5, 9, and 12 of the sequence correctly, V(R)=13 (the next higher BSN after 12), and V(Q)=6 (the lowest BSN of a block that was not received correctly). Alternatively, if an MS has received blocks 1, 2, 3, 4, and 5 correctly, but block 6 was received with errors, V(R)=7 and V(Q)=6. Finally, if an MS has received blocks 1, 2, 3, 4, 5, and 6 correctly, then V(R)=V(Q)=7 (i.e., all blocks 1-6 have been received correctly).

When using DTR information included within a RLC data block to cause the MS to enter DTR, it may not be necessary that all three conditions be satisfied in any particular order. For example, an MS may first receive blocks 1, 2, 3, and 4, then receive block 7 containing DTR information, and then later receive blocks 5, and 6 (e.g. in response to a request for retransmission). At that end of that sequence, even though all blocks were not received in order and all conditions were not satisfied in order, the MS will enter DTR because V(Q)=V (R)=8, and the block with BSN=V(R)−1 (i.e. 7) contained DTR information (presuming the MS has responded to any pending polls).

Note that if the network should subsequently receive an acknowledgement of all blocks up to and including block 7 from the MS, the network can determine that the MS has entered DTR. To trigger such an acknowledgement, the network may poll the MS—polls are indicated by settings of bits (such as in the relative reserved block period (RRBP)/combined EGPRS supplementary polling (CESP) fields) in the header of radio blocks.

When using DTR information included within a RLC data block to cause the MS to enter DTR, Table 1 illustrates an example EGPRS downlink RLC data block for instructing an MS to enter DTR.

TABLE 1

| Bit | | | | | | | |
|---|---|---|---|---|---|---|---|
| 2 | | | | | 1 | | |
| FBI | | | | | E | | |

| Bit | | | | | | | | |
|---|---|---|---|---|---|---|---|---|
| 8 | 7 | 6 | 5 | 4 | 3 | 2 | 1 | |
| Length indicator | | | | | | | E | Octet 1 (note) (optional) |
| . | | | | | | | . | . |
| . | | | | | | | . | . |
| Length indicator | | | | | | | E | Octet M (optional) |
| RLC data | | | | | | | | Octet M + 1 |
| | | | | | | | | . |
| | | | | | | | | . |
| | | | | | | | | Octet K − 1 |
| spare | DTR Blks | | CI | | TN/PDCH-pair | | | Octet K (optional) |
| | | | | | | | | . |
| | | | | | | | | . |
| | | | | | | | | Octet N2 − 1 |
| | | | | | | | | Octet N2 |

Referring to Table 1, the carrier ID (CI) field contains a identification of the carrier that may be encoded as DTR_CI IE. The CI field can be used to indicate the carrier that the MS monitors when DTR is used. In that case, the timeslot or PDCH-pair to monitor on that carrier can be indicated with the TN/PDCH-pair field. The TN/PDCH-pair field may contain the timeslot number (BTTI configuration) or the PDCH-pair number (RTTI configuration) the MS monitors on the indicated carrier (CI field) when DTR is implemented. Finally, the DTR Blks field may indicate a subset of downlink radio blocks during which the MS monitors for USFs and/or downlink RLC data blocks when in DTR mode. In some cases, when causing an MS to enter DTR, in both options 1 and 2 described above, there may be a maximum reaction period permitted between the conditions for an MS to enter DTR being satisfied and the MS actually entering DTR.

When ordering an MS into DTR, however, there is some inefficiency regarding MS entry to DTR when one or more uplink blocks are missing or have not been received correctly by the network. If there are pending retransmissions of uplink blocks (i.e., from the MS to the network), in existing network implementations the MS may be unable to enter DTR before sending the uplink blocks, and after transmitting the uplink blocks may be delayed in entering DTR. Furthermore, when an MS is in DTR or in a pending DTR state and the MS has new data to transmit to the network, there is some inefficiency when the MS also has to retransmit previously transmitted uplink blocks to the network. The retransmission of the previously-transmitted uplink blocks will both delay the transmission of new uplink blocks as well as delay the MS exiting DTR or the pending DTR state.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
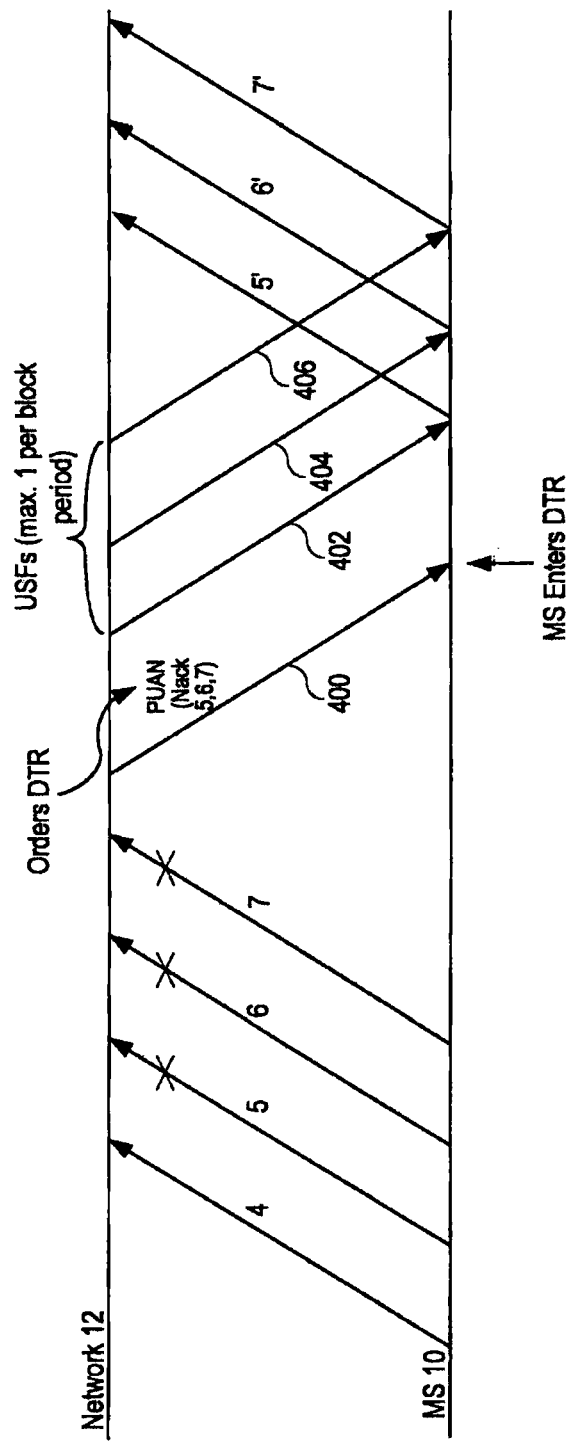
FIG. 1 is a sequence diagram showing retransmission of uplink blocks after an MS has entered DTR.

The present disclosure relates generally to data transmission protocols in mobile communication systems and, more specifically, to a system and method for uplink data transfer in dynamic timeslot reduction (DTR).

One embodiment includes a method for communicating with a network. The method includes receiving an assignment of first timeslots for uplink communications, and receiving an instruction to reduce monitoring to a set of timeslots. The set of timeslots has a number of timeslots less than a number of timeslots to be monitored in accordance with the assignment. The method includes receiving a negative acknowledgement of one or more radio blocks previously transmitted to the network, retransmitting at least one of the one or more radio blocks, and, after retransmitting the at least one of the one or more radio blocks and before receiving a second instruction to reduce monitoring, reducing monitoring to the set of timeslots.

Another embodiment includes a method for communicating with a mobile station. The method includes transmitting an assignment of first timeslots for uplink communications, and transmitting an instruction to reduce monitoring to a set of timeslots. The set of timeslots has a number of timeslots less than a number of timeslots to be monitored in accordance with the assignment. The method includes transmitting a negative acknowledgement of one or more radio blocks previously received from the mobile station, receiving a retransmission of at least one of the one or more radio blocks, and, after receiving a retransmission of the at least one of the one or more radio blocks and before transmitting a second instruction to the mobile station to reduce monitoring to a set of timeslots, determining that the mobile station has reduced a set of timeslots being monitored by the mobile station to the set of timeslots.

Another embodiment includes a method for communicating with a mobile station. The method includes transmitting an instruction to the mobile station to monitor a subset of a first assignment of timeslots for uplink communications, transmitting a negative acknowledgement of a number of radio blocks previously transmitted by the mobile station, and transmitting an allocation of resources on a number of timeslots. The allocation of resources on one or more timeslots allocates resources on at least one timeslot that is not within the subset of the first assignment of timeslots.

Another embodiment includes a mobile station including a processor configured to receive an assignment of first timeslots for uplink communications, and receive an instruction to reduce monitoring to a set of timeslots. The set of timeslots has a number of timeslots less than a number of timeslots to be monitored in accordance with the assignment. The processor is configured to receive a negative acknowledgement of one or more radio blocks previously transmitted to a network, retransmit at least one of the one or more radio blocks, and, after retransmitting the at least one of the one or more radio blocks and before receiving a second instruction to reduce monitoring, reduce monitoring to the set of timeslots.

Another embodiment includes a network component comprising a processor configured to transmit an assignment of first timeslots for uplink communications, and transmit an instruction to reduce monitoring to a set of timeslots. The set of timeslots has a number of timeslots less than a number of timeslots to be monitored in accordance with the assignment. The processor is configured to transmit a negative acknowledgement of one or more radio blocks previously received from a mobile station, receive a retransmission of at least one of the one or more radio blocks, and, after receiving a retransmission of the at least one of the one or more radio blocks and before transmitting a second instruction to the mobile station to reduce monitoring to a set of timeslots, determine that the mobile station has reduced a set of timeslots being monitored by the mobile station to the set of timeslots.

Another embodiment includes a method for communicating with a network. The method includes receiving an assignment of first timeslots for uplink communications, and receiving an instruction to reduce monitoring to a set of timeslots. The set of timeslots has a number of timeslots less than a number of timeslots to be monitored in accordance with the assignment. The method includes receiving a negative acknowledgement of a data block previously transmitted to the network, and, after receiving the instruction to reduce monitoring and the negative acknowledgement, transmitting a new data block to the network before retransmitting the data block previously transmitted to the network.

Another embodiment includes a method for communicating with a mobile station. The method includes transmitting an assignment of first timeslots for uplink communications, and transmitting an instruction to reduce monitoring to a set of timeslots. The set of timeslots has a number of timeslots less than a number of timeslots to be monitored in accordance with the assignment. The method includes transmitting a negative acknowledgement of a data block previously received from the mobile station, receiving a radio block containing new data, and, after receiving the radio block containing new data, determining that the mobile station is monitoring the number of timeslots to be monitored in accordance with the assignment.

Another embodiment includes a method for communicating with a mobile station. The method includes transmitting an assignment of first timeslots for uplink communications, and transmitting an instruction to monitor a subset of the first assignment of timeslots for uplink communications. A number of timeslots in the subset is less than a number of timeslots to be monitored in accordance with the assignment. The method includes transmitting a negative acknowledgement of one or more radio blocks previously received from the mobile station. When a retransmission of at least one of the one or more radio blocks is received from the mobile station, the method includes determining that the mobile station has reduced a set of timeslots being monitored by the mobile station to the subset of the first assignment. When a transmission of new data is received from the mobile station, the method includes determining that the mobile station is monitoring each of the first assignment of timeslots.

Another embodiment includes a mobile station comprising a processor configured to receive an assignment of first timeslots for uplink communications, and receive an instruction to reduce monitoring to a set of timeslots. The set of timeslots has a number of timeslots less than a number of timeslots to be monitored in accordance with the assignment. The processor is configured to receive a negative acknowledgement of a data block previously transmitted to a network, and, after receiving the instruction to reduce monitoring and the negative acknowledgement, transmit a new data block to the network before retransmitting the data block previously transmitted to the network.

Another embodiment includes a network component comprising a processor configured to transmit an assignment of first timeslots for uplink communications, and transmit an instruction to reduce monitoring to a set of timeslots. The set of timeslots has a number of timeslots less than a number of timeslots to be monitored in accordance with the assignment. The processor is configured to transmit a negative acknowledgement of a data block previously received from a mobile station, receive a radio block containing new data, and, after receiving the radio block containing new data, determine that the mobile station is monitoring the number of timeslots to be monitored in accordance with the assignment.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, channel, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

When an MS is ordered to enter DTR (i.e., to reducing monitoring to a subset of assigned timeslots), if there are pending uplink retransmissions, it is preferable that the MS be able to both transmit the pending uplink blocks efficiently and also enter DTR quickly. However, depending upon the process with which the MS enters DTR, the retransmission of the uplink blocks may be delayed, or the MS may be delayed in entering DTR.

If an MS enters DTR while there are still pending uplink retransmissions, for example, the limited number of timeslots available in DTR may delay those retransmissions—generally in DTR there is only a single (or, in some RTTI scenarios, two) USF per radio block period limiting the MS to transmit a single uplink block per radio block period. Note that the number of uplink resources available when an MS is in DTR is not necessarily reflected by the number of USFs transmitted to an MS, instead it is reflected by the number of resources (i.e., allocated radio blocks) allocated by those USFs. Because, in DTR, the resources for uplink transmissions are so limited, it may take some time before the MS can complete all uplink retransmissions. For example, FIG. 1 is a sequence diagram showing retransmission of uplink blocks after an MS has entered DTR.

Referring to FIG. 1, MS 10 transmits uplink blocks 4, 5, 6, and 7 to network 12. In the sequence diagrams of the present disclosure, the radio block transmissions are shown as arrows passing between MS 10 and network 12 and time passes from left to right. Network 12 may include any appropriate network component, such as a component of a wireless communications network configured to communicate with an MS. As such, moving from left to right in each diagram, the arrows represent sequential communications of radio blocks between MS 10 and network 12. Also, blocks having a BSN of N are referred to as block N.

As shown in FIG. 1, network 12 fails to successfully receive blocks 5, 6, and 7. Accordingly, after failing to receive blocks 5, 6, and 7, network 12 transmits packet uplink ACK/NACK (PUAN) 400 to MS 10. PUAN 400 includes a NACK for each of blocks 5, 6, and 7 and thereby informs MS 10 that MS 10 must retransmit blocks 5, 6, and 7 to network 12.

In this example, after receiving PUAN 400, MS 10 is configured to enter DTR. PUAN 400 may have instructed MS 10 to enter DTR, or network 12 may have used any other appropriate mechanism for causing MS 10 to enter DTR. Accordingly, because MS 10 is in DTR, MS 10 only receives at most a single USF per radio block allocating uplink radio block(s) that MS 10 may use for retransmitting each of blocks 5, 6, and 7. Accordingly, with reference to FIG. 1, after receiving USF 402, MS 10 retransmits block 5 as block 5' to network 12. After receiving USF 404, MS 10 retransmits block 6 as block 6' to network 12. And after receive USF 406, MS 10 retransmits block 7 as block 7' to network 12.

Accordingly, in this example, although the MS 10 was able to enter DTR quickly, it required three radio block periods (in DTR only a single USF may be received per radio block period, and in this example, each USF allocates only a single uplink radio block) before MS 10 was able to retransmit each of blocks 5, 6, and 7. As such, the retransmission of those blocks requires an extended number of radio block periods causing delay in the uplink retransmissions.

Also, if the MS should be in DTR when the MS has both outstanding NACKED uplink blocks (e.g. because the PUAN ordering the MS into DTR also indicated NACKs for one or more transmitted uplink data blocks) and new data (e.g., a new data block that has not been previously transmitted) to transmit to the network, the MS may be stuck in DTR while the MS retransmits the NACKED blocks. This is because the MS may be required to prioritize transmissions of NACKED blocks over blocks containing new data. In other words, the MS is required to send the NACKED blocks before new data blocks. Because the retransmission of NACKED blocks does not cause the MS to leave DTR (unlike the transmission of new data which cause the MS to leave DTR and may prompt the network to allocate additional uplink resources), there may be delay in the MS both retransmitting the NACKED blocks and, eventually, transmitting the new data. With these prioritization rules, therefore, an MS that is in DTR but has both NACKED data and new data to send cannot send the new data (and hence leave DTR and signal this to the network) until the MS has transmitted all NACKED data.

Sometimes, to avoid the delay associated with receiving uplink retransmission from an MS 10 in DTR, the network will avoid ordering the MS into DTR until the network has successfully received all uplink blocks from the MS. In that implementation, after notifying the MS that the MS must retransmit certain uplink blocks, the network then waits for the retransmissions, and, after receiving the retransmissions sends a subsequent PUAN acknowledging receipt of the uplink transmissions and ordering the MS into DTR. The MS then is able to enter DTR. This process will delay entry to DTR (and unnecessarily result in battery consumption), particularly if it takes multiple retransmissions for a block to be received correctly.

Figure 2:
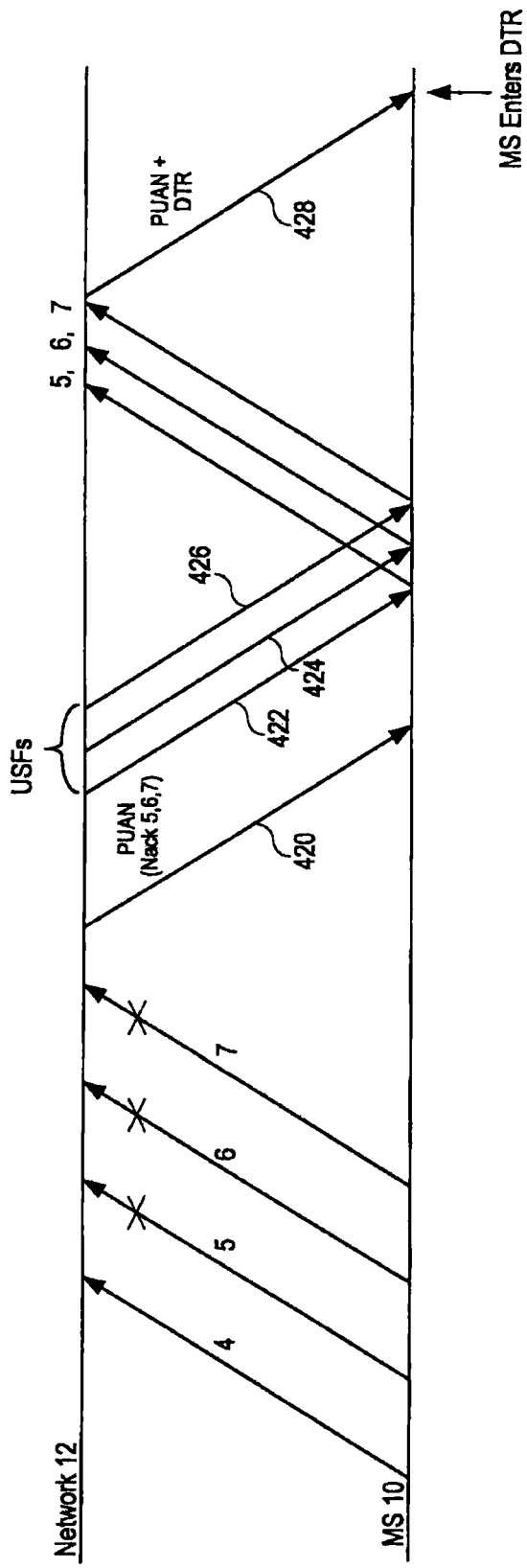
FIG. 2 is a sequence diagram showing retransmission of uplink blocks, where the MS delays entry into DTR until the retransmission of uplink blocks is complete.

FIG. 2 is a sequence diagram showing retransmission of uplink blocks, where the MS entry into DTR is delayed until the retransmission of uplink blocks is complete and the MS has received acknowledgement of their correct reception by the network. As shown in FIG. 2, MS 10 transmits uplink blocks 4, 5, 6, and 7 to network 12. Network 12, however, fails to successfully receive blocks 5, 6, and 7. Accordingly, after failing to receive blocks 5, 6, and 7, network 12 transmits packet uplink ACK/NACK (PUAN) 420 to MS 10. PUAN 420 includes a NACK for blocks 5, 6, and 7 and thereby informs MS 10 that MS 10 must retransmit blocks 5, 6, and 7 to network 12.

At this time, MS 10 does not enter DTR and instead performs retransmissions of the NACKED blocks. In a following radio block period, network 12 transmits USFs 422, 424, and 426 to MS 10 informing MS 10 that it has three uplink allocations in a following radio block period. After receiving USFs 422, 424, and 426, MS 10 retransmits blocks 5, 6, and 7 as blocks 5', 6', and 7'.

If network 12 successfully receives blocks 5', 6', and 7', network 12 transmits PUAN 428 to MS 10 informing MS 10 that the uplink blocks were successfully received and that MS 10 should enter DTR. After receiving PUAN 428, MS 10 may then enter DTR. Accordingly, even though blocks 5', 6', and 7' were transmitted in a single radio block period, there is some delay and communications between the network and MS before MS 10 is able to enter DTR.

It should be noted that in the present embodiment, once NACKED blocks have been retransmitted (e.g., blocks 5', 6' and 7' of FIG. 2) and become PENDING_ACK (i.e. where the blocks have been transmitted recently and no acknowledgement—positive or negative—has been received from the network, taking into account the most recent transmission), whether the blocks are required to be further pre-emptively retransmitted (i.e. retransmitted before a PUAN is received which indicates whether or not the network received the most recent transmission(s) correctly) by the MS may depend on whether a pre-emptive retransmission bit is set in the PUAN message.

Accordingly, in the embodiments illustrated in FIGS. 1 and 2, there are tradeoffs. Either the MS enters DTR quickly, with a delay in any necessary uplink retransmissions, or the MS quick performs uplink retransmission with a delay in the MS being able to enter DTR.

In this embodiment, therefore, the MS does not enter DTR immediately upon receipt from the network of instructions to enter DTR (e.g., via a PUAN containing DTR information or DTR information included within a Radio Link Control (RLC) data block transmitted to the MS). Instead, the MS is configured to monitor all timeslots (or at least, those on which USFs may be received) until the MS has received sufficient USFs to retransmit any NACKED blocks (taking into account reaction times allowed for processing the PUAN i.e. USFs sent immediately after the PUAN may not count if the MS could not be expected to respond to the PUAN using the allocated resources), and then enters DTR. This allows the MS to both retransmit any NACKED uplink blocks and quickly enter DTR after retransmitting those blocks without waiting for a further specific instruction to enter DTR from the network. In one embodiment, the relevant set of NACKED blocks may include all blocks which have status NACKED after reception of the ACK/NACK information which was sent in the same radio block as the indication to enter DTR. Note, the ACK/NACK information may be included in a PUAN or via other ACK/NACK indications (e.g., a via piggy-backed ACK/NACK field, which incidentally, may not contain DTR information). In another embodiment, the relevant set of NACKED blocks includes only those blocks which were set to NACKED (or whose NACKED status was explicitly confirmed) as a result of the ACK/NACK information which was sent in the same radio block as the indication to enter DTR. In some embodiments, ACK/NACK information can be received in piggy-backed ACK/NACK bitmaps, for example.

In these embodiments, from the network's perspective, because the network knows both how many uplink blocks were NACKED and how many USFs the network has sent to the MS since sending the message that instructed the MS to enter DTR blocks, the network can determine when the MS has received allocation of sufficient resources to retransmit the NACKED blocks and entered DTR. Furthermore, because the USFs are very robustly encoded, the network can assume with high reliability exactly when the MS enters DTR, without incurring any delay, such as would be incurred if the network were to rely on a message transmitted by the MS once it had entered (or was ready to enter) DTR.

Figure 3:
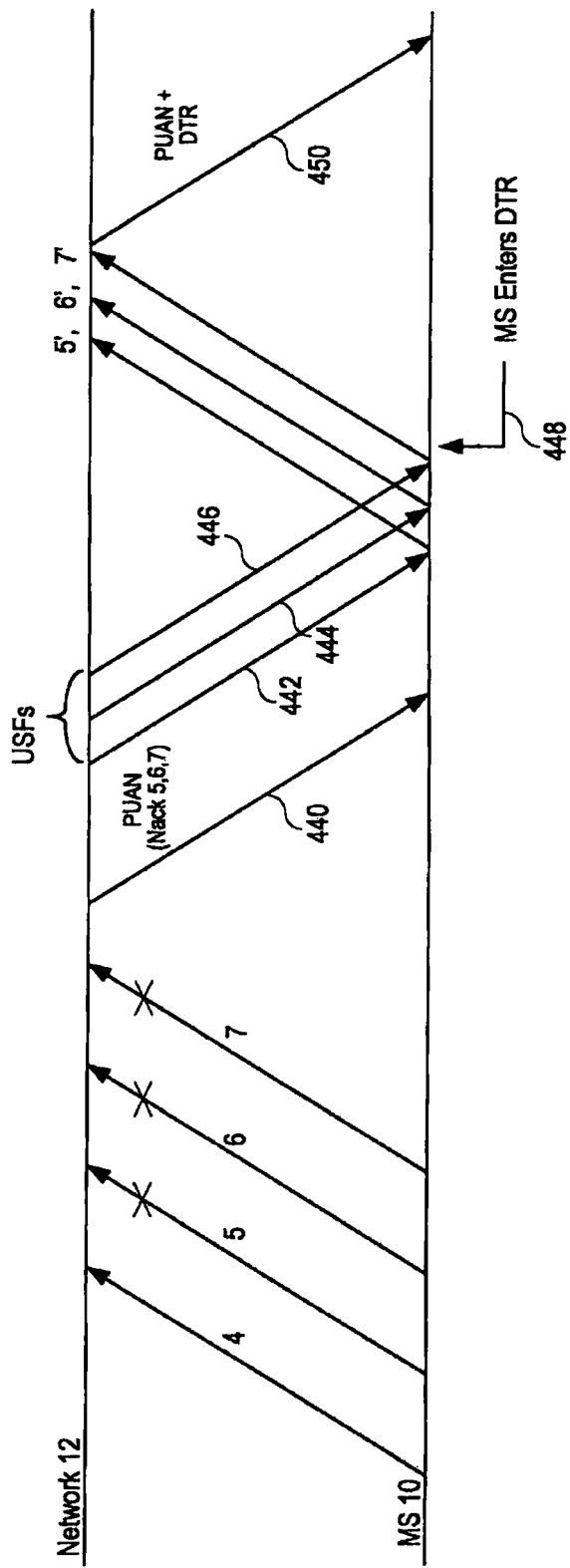
FIG. 3 is a sequence diagram showing an MS entering DTR after retransmitting NACKED uplink blocks.

As an example of this embodiment, FIG. 3 is a sequence diagram showing an MS entering DTR after retransmitting NACKED uplink blocks. As shown in FIG. 3, MS 10 transmits uplink blocks 4, 5, 6, and 7 to network 12. Network 12, however, fails to successfully receive blocks 5, 6, and 7. Accordingly, after failing to receive blocks 5, 6, and 7, network 12 transmits PUAN 440 to MS 10. PUAN 440 includes a NACK for blocks 5, 6, and 7 and thereby informs MS 10 that MS 10 must retransmits blocks 5, 6, and 7 to network 12. Note that two separate PUANs may be used instead where the first PUAN contains DTR Information, and the second PUAN identifies NACKED uplink blocks. PUAN 440 also instructs MS 10 to enter DTR. In this example, although PUAN 440 is used to inform MS 10 that it should enter DTR, any other appropriate mechanism may be used to cause MS 10 to enter DTR (e.g., such as by means of DTR information included within a Radio Link Control (RLC) data block transmitted to the MS).

At this time, because MS 10 has pending uplink block retransmissions, MS 10 does not enter DTR and instead waits to retransmit blocks 5, 6, and 7 to network 12. At this time, MS 10 is in what may be referred to as a "pending" DTR state. In this state, MS 10 listens for USFs on all available timeslots, rather than on the reduced set that would be listened to if the MS were in DTR. In a following radio block period, network 12 transmits USFs 442, 444, and 446 to MS 10 informing MS 10 that it has three uplink allocations in a following radio block period (because network 12 transmitted PUAN 440 that included several NACKs, network 12 knows that MS 10 is in a pending DTR state and is listening for allocation of resources on all timeslots). After receiving USFs 442, 444, and 446, MS 10 retransmits blocks 5, 6, and 7 as blocks 5', 6', and 7' using the allocated resources. Accordingly, MS 10 is able to retransmit blocks 5, 6, and 7 in a single radio block period (contrast with the example sequence shown in FIG. 1 where MS 10 had to wait for several block periods before all required retransmissions were completed).

Note that in accordance with the present disclosure, an MS that receives NACKs for one or more uplink blocks while in DTR may leave DTR to enter the pending DTR state. At that time, the MS can make use of the additional uplink resources allocated by the network to retransmit the NACKED blocks and can then quickly enter DTR after retransmitting the blocks (i.e., before receiving an instruction to enter DTR from the network).

After transmitting blocks 5', 6', and 7', rather than wait for additional instructions from network 12 to enter DTR, MS 10 autonomously enters DTR at time 448. After successfully receiving retransmitted blocks 5', 6' and 7', network 12 may optionally transmit PUAN 450 to MS 10. PUAN 450 may include DTR Information (as shown in FIG. 3) as confirmation to MS 10 to enter DTR. Upon receipt of PUAN 450, however, in this example MS 10 has already entered DTR.

In this embodiment, because the network knows both how many uplink blocks were NACKED in PUAN 440 and how many USFs the network has sent since sending the PUAN, the network can determine when the MS has entered DTR. With reference to FIG. 3, upon transmitting PUAN 440, network 12 knows that MS 10 has three uplink blocks to retransmit. Accordingly, network 12 can determine that after transmitting the third USF 446, MS 10 will retransmit the three NACKED blocks and, following transmission of the third NACKED block, enter DTR (e.g., at time 448 on FIG. 3). It should be noted, however, that there is no adverse behavior if the network were to transmit another instruction to the MS to enter DTR even after the MS had actually entered DTR (see PUAN 450 on FIG. 3, for example).

In this embodiment, it should be noted that because the modulation and coding scheme (MCS) used for all uplink transmissions are explicitly commanded by the network (or are specified in terms of such explicit commands), both the network and MS know how many uplink radio blocks (and therefore how many USFs) are required to retransmit the outstanding NACKED blocks. In embodiments described above, one USF is assumed to allocate a single uplink radio block; however, in some embodiments (such as when Extended Dynamic Allocation is used) a single USF may indicate an allocation of multiple uplink radio blocks; in these embodiments, it is the number of allocated uplink radio blocks that is counted, rather than the number of USFs, for determining whether an MS has been allocated a sufficient number of resources to permit retransmission of data blocks and therefore whether an MS has entered into DTR.

If pre-emptive retransmission is not required, then the MS is not required to respond to any USFs while it has only PENDING_ACK blocks and no NACKED blocks, or new data, to send. Also, the indication of NACKED blocks may take into account only those indicated in the PUAN or may take account of those previously received PUANs. If the MS is configured to perform preemptive retransmission, however, the MS may use any allocated uplink resources to retransmit (without having received a NACK from the network) any combination of previously transmitted blocks in an attempt to prevent the network from having to transmit a PUAN with NACK information should any of the blocks not be received successfully.

Accordingly, in one embodiment, upon reception of a PACKET UPLINK ACK/NACK message containing valid DTR information, an MS that is not already in DTR and has neither transmitted nor received any RLC data block during the (max(BS_CV_MAX, 1)−1) block periods before the radio block period in which the PACKET UPLINK ACK/NACK message was received may be configured to, if one or more elements of V(B) (where V(B) is an array of elements corresponding to transmitted data blocks) are set to NACKED after (or, in some embodiments, as a direct result of) processing the PACKET UPLINK ACK/NACK message, monitor all assigned timeslots on which USFs may be received in accordance with the uplink assignment. When no elements of V(B) have status NACKED, the MS may begin monitoring only the indicated PDCH or PDCH-pair (and if applicable, carrier) within the reaction time (as specified in 3GPP TS 45.010. Otherwise (e.g. if no elements of V(B) have status NACKED), the MS may start monitoring only the indicated PDCH or PDCH-pair (and if applicable, carrier) within the reaction time specified in 3GPP TS 45.010 and enter DTR.

Accordingly, an MS in DTR (or, which will enter DTR after retransmission of NACKED data blocks and which may be described as in "pending DTR" state) which receives a PACKET UPLINK ACK/NACK message containing DTR information can assume the DTR information is unchanged independent of the contents of the DTR information. If the PACKET UPLINK ACK/NACK message caused one or more elements of V(B) to be set to NACKED, the MS can monitor all assigned timeslots on which USFs may be received in accordance with the uplink assignment, until no elements of V(B) have status NACKED, then re-enter DTR.

In some embodiments, the entry to the "pending DTR" state described above is only possible from non-DTR mode. In other embodiments, the MS may enter "pending DTR" state (i.e. monitoring more timeslots than are required to be monitored in DTR mode pending retransmission of NACKED data) in response to ACK/NACK information received when the MS is already in DTR mode. In some embodiments, the MS may extend the duration of an ongoing pending DTR state in response to ACK/NACK information received while in pending DTR state.

In another embodiment, while the MS is either in DTR or in the pending DTR state described above, the MS and/or network is configured to prioritize the transmission of new data blocks over NACKED data in order to return the MS to non-DTR mode (or avoid entering DTR) and avoid/minimize any reduction in resource allocation caused by the network assuming the mobile has entered DTR. The network may reduce the uplink resource allocation, for example, after sending the last USF required to allow the retransmission of NACKED blocks as shown in FIG. 3. In that case, it could require at least one round-trip time for the network to transmit a subsequent USF and receive the new data on the allocated radio block, and realize that the MS is not in DTR.

Figure 4:
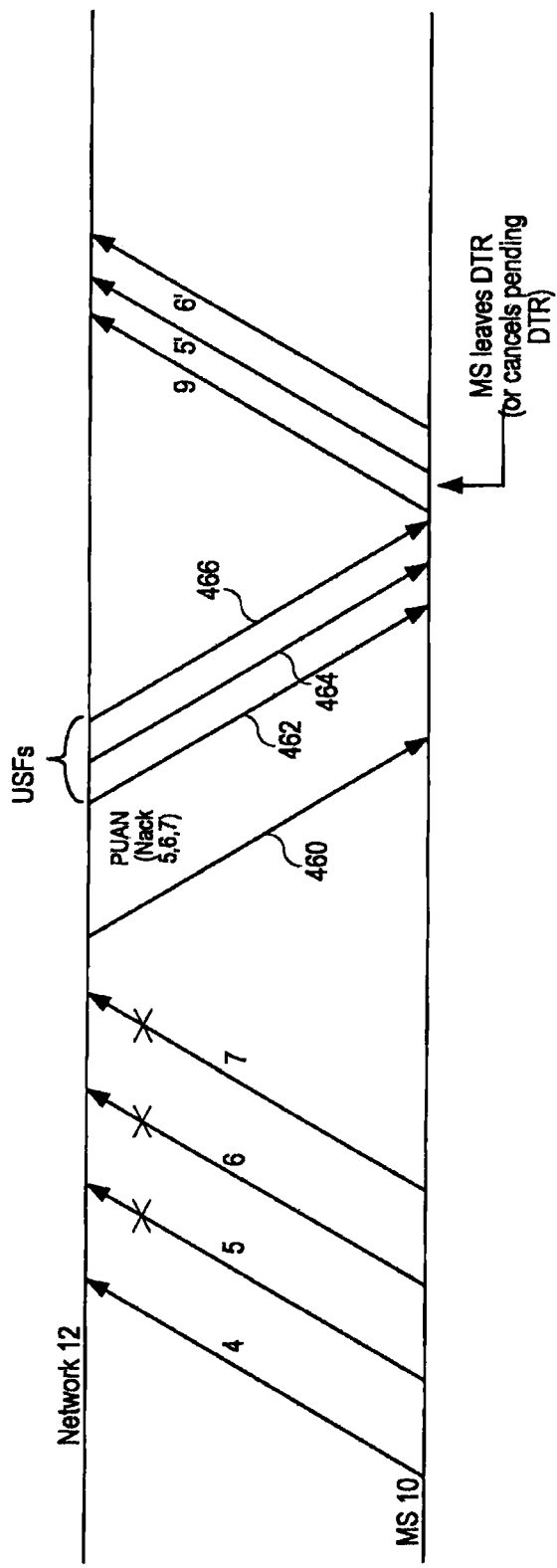
FIG. 4 is an illustration of an MS prioritizing new data transmissions over the retransmission of NACKED blocks to maximize a number of available resources for uplink transmission.

FIG. 4 is an illustration of an MS prioritizing new data transmissions over the retransmission of NACKED blocks to maximize a number of available resources for uplink transmission. As shown in FIG. 4, MS 10 transmits uplink blocks 4, 5, 6, and 7 to network 12. Network 12, however, fails to successfully receive blocks 5, 6, and 7. Accordingly, after failing to receive blocks 5, 6, and 7, network 12 transmits packet uplink ACK/NACK (PUAN) 460 to MS 10. PUAN 460 includes a NACK for blocks 5, 6, and 7 and thereby informs MS 10 that MS 10 must retransmits blocks 5, 6, and 7 to network 12. Note that two separate PUAN may be used where the first PUAN contains DTR Information, and the second PUAN identifies NACKED uplink blocks. PUAN 460 also instructs MS 10 to enter DTR. In this example, although PUAN 460 is used to inform MS 10 that it should enter DTR, any other appropriate mechanism may be used to cause MS 10 to enter DTR (e.g., such as by means of DTR information included within a Radio Link Control (RLC) data block transmitted to the MS).

At this time, MS 10 does not enter DTR and instead waits to retransmit blocks 5, 6, and 7 to network 12. At this time, MS 10 is in what may be referred to as a "pending" DTR state. Accordingly, MS 10 listens for USFs on all available timeslots, rather than the reduced set that would be listened to if the MS were in DTR. In a following radio block period, network 12 transmits USFs 462, 464, and 466 to MS 10 informing MS 10 that it has three uplink allocations in a following radio block period.

At this time, however, MS 10 has new data (data block 9) to send to network 12. Accordingly, MS 10 does not want to use the three allocated USFs (USFs 462, 464, and 466) for retransmitting blocks 5, 6, and 7, only to then have the network believe the MS has entered DTR (in accordance with the sequence shown in FIG. 3) and, accordingly, allocate fewer resources for uplink communications.

Accordingly, rather than retransmit blocks 5, 6, and 7 using the allocated uplink resources, MS 10 prioritizes at least a portion of the new data to be transmitted before the NACKED blocks. Accordingly, after receiving the three USFs, MS 10 transmits block 9 and retransmits block 5 as block 5', and block 6 as block 6'.

After receiving the new block 9, network 12 knows that MS 10 has transmitted new data and, therefore, did not enter DTR immediately following the retransmittal of blocks 5, 6, and 7.

Network 12 can, therefore, allocate additional resources to MS 10 to allow for efficient communication of uplink blocks. At that time, the network may treat MS 10 as if it has left DTR.

Note that in accordance with the present embodiment, the network may be configured to also prioritize transmission of new data to the MS (where the MS may or may not be similarly configured to prioritize new data as described above). If, for example, the MS is in DTR, and the network has both NACKED downlink blocks to retransmit to the MS as well as new data, the network may prioritize the new data over the NACKED blocks. This would cause the MS to exit DTR allowing the network to use additional resources when transmitting the new data to the MS. After the new data is transmitted to the MS, the network can retransmit any NACKED blocks.

Accordingly, in one embodiment, when the MS is in DTR, and has new data to transmit (i.e. the block with BSN=V(S) is available) the MS may prioritize the transmission of the RLC data block with BSN=V(S) over RLC data blocks whose corresponding element has value NACKED. In some cases, this occurs no more than once per DTR mode period.

Figure 5:
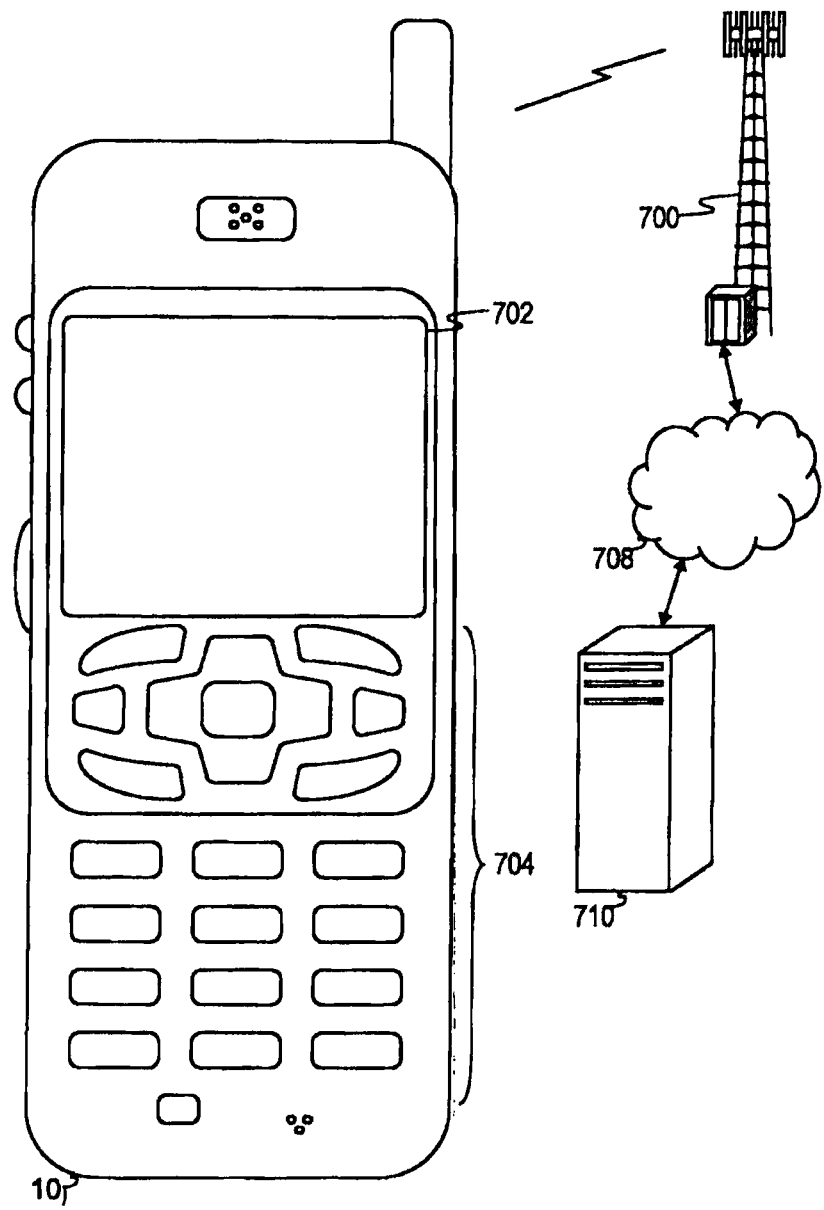
FIG. 5 is a diagram of a wireless communications system including an MS operable for some of the various embodiments of the disclosure.

Referring now to FIG. 5, a wireless communications system including an embodiment of an exemplary MS 10 is illustrated. The MS is operable for implementing aspects of the disclosure, but the disclosure should not be limited to these embodiments. Though illustrated as a mobile phone, the MS may take various forms including a wireless handset, a pager, a personal digital assistant (PDA), a portable computer, a tablet computer, a laptop computer, smart phones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the MS 10 is not a general purpose computing device like a portable, laptop or tablet computer, but rather is a special-purpose communications device such as a mobile phone, a wireless handset, a pager, a PDA, or a telecommunications device installed in a vehicle. The MS 10 may also be a device, include a device, or be included in a device that has similar capabilities but that is not transportable, such as a desktop computer, a set-top box, or a network node. The MS 10 may support specialized activities such as gaming, inventory control, job control, and/or task management functions, and so on.

The MS 10 includes a display 702. The MS 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The MS 10 may present options for the user to select, controls for the user to actuate, and/or cursors or other indicators for the user to direct.

The MS 10 may further accept data entry from the user, including numbers to dial or various parameter values for configuring the operation of the MS 10. The MS 10 may further execute one or more software or firmware applications in response to user commands. These applications may configure the MS 10 to perform various customized functions in response to user interaction. Additionally, the MS 10 may be programmed and/or configured over-the-air, for example from a wireless base station, a wireless access point, or a peer MS 10.

Among the various applications executable by the MS 10 is a web browser, which enables the display 702 to show a web page. The web page may be obtained via wireless communications with a wireless network access node, a cell tower, a peer MS 10, or any other wireless communication network or system 700. The network 700 is coupled to a wired network 708, such as the Internet. Via the wireless link and the wired network, the MS 10 has access to information on various servers, such as a server 710. The server 710 may provide content that may be shown on the display 702. Alternately, the MS 10 may access the network 700 through a peer MS 10 acting as an intermediary, in a relay type or hop type of connection.

Figure 6:
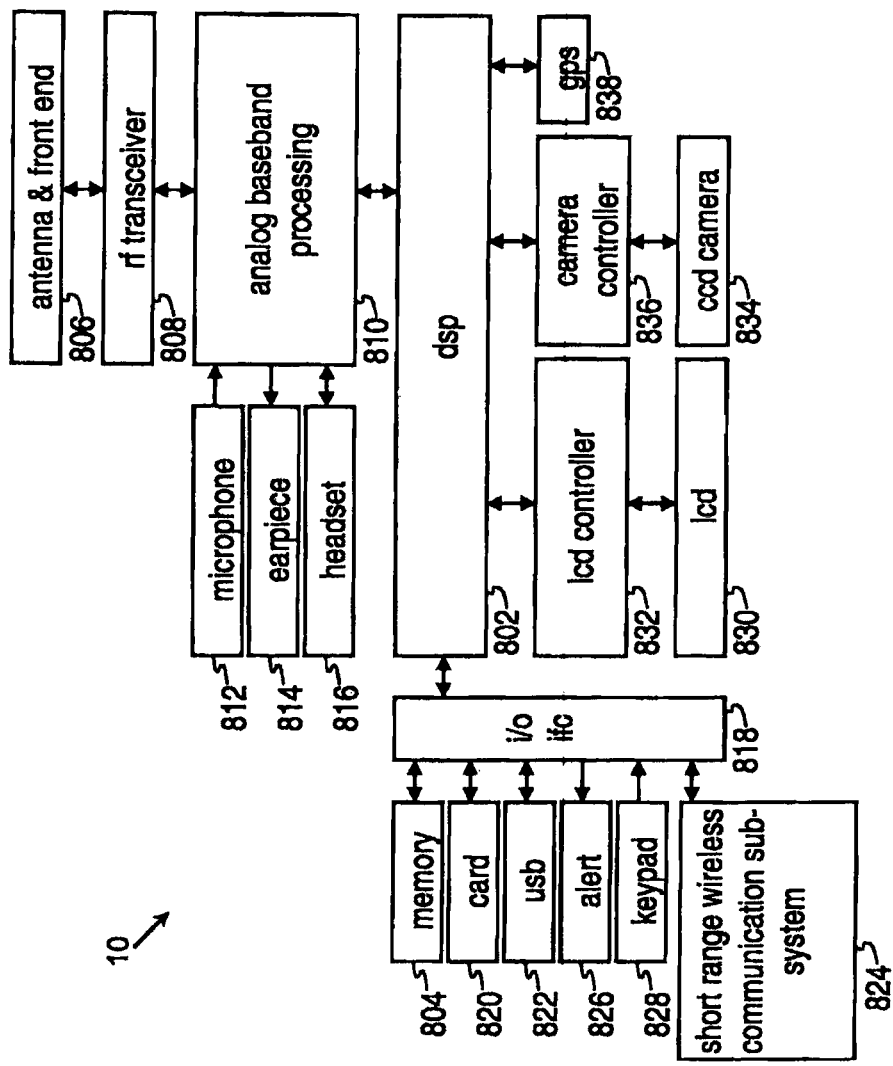
FIG. 6 is a block diagram of an MS operable for some of the various embodiments of the disclosure.

FIG. 6 shows a block diagram of the MS 10. While a variety of known components of UAs 10 are depicted, in an embodiment a subset of the listed components and/or additional components not listed may be included in the MS 10. The MS 10 includes a digital signal processor (DSP) 802 and a memory 804. As shown, the MS 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the MS 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the MS 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the MS 10 to send and receive information from a cellular network or some other available wireless communications network or from a peer MS 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the MS 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the MS 10 and may also enable the MS 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the MS 10 to communicate wirelessly with other nearby mobile devices and/or wireless base stations.

The input/output interface 818 may further connect the DSP 802 to the alert 826 that, when triggered, causes the MS 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the MS 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the MS 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the MS 10 to determine its position. Various other peripherals may also be included to provide additional functions, e.g., radio and television reception.

Figure 7:
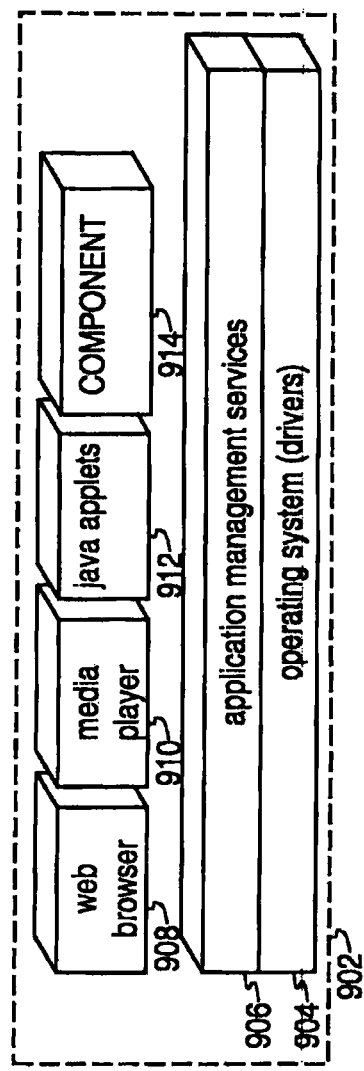
FIG. 7 is a diagram of a software environment that may be implemented on a UE operable for some of the various embodiments of the disclosure.

FIG. 7 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the MS 10. Also shown in the figure are a web browser application 908, a media player application 910, and Java applets 912. The web browser application 908 configures the MS 10 to operate as a web browser, allowing a user to enter information into forms and select links to retrieve and view web pages. The media player application 910 configures the MS 10 to retrieve and play audio or audio-visual media. The Java applets 912 configure the MS 10 to provide games, utilities, and other functionality. A component 914 might provide functionality described herein.

Figure 8:
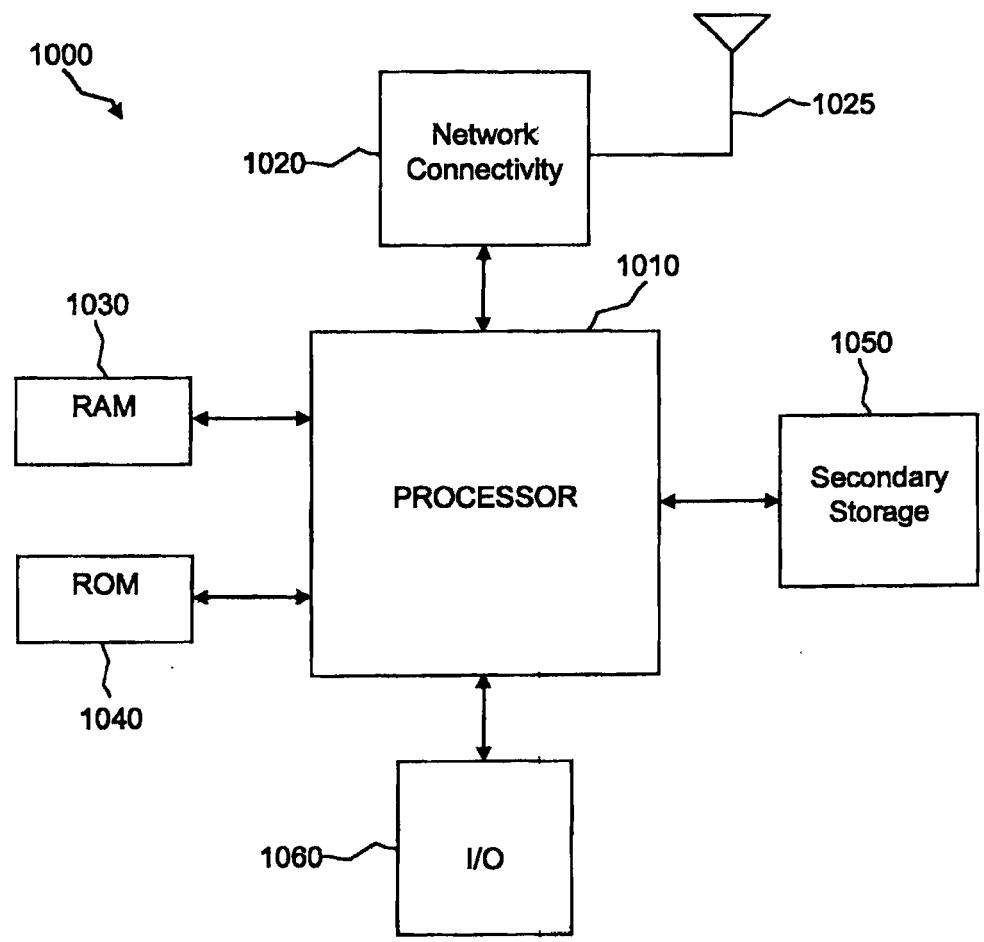
FIG. 8 is an illustrative general purpose computer system suitable for some of the various embodiments of the disclosure.

The MS 10, access device 120, and other components described above might include a processing component that is capable of executing instructions related to the actions described above. FIG. 8 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the MS 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communicating with a network, comprising:

receiving, by a mobile station, an assignment of a set of timeslots for uplink communications;

receiving, by the mobile station, an instruction to monitor a reduced set of timeslots, the reduced set of timeslots having a number of timeslots less than a number of timeslots to be monitored in accordance with the assignment;

receiving, by the mobile station, a negative acknowledgement of a data block previously transmitted to the network; and in response to receiving the instruction to monitor the reduced set of timeslots and receiving the negative acknowledgement, transmitting, by the mobile station, a new data block to the network before retransmitting the data block previously transmitted to the network, wherein transmitting the new data block includes using a resource on at least one timeslot that corresponds to a timeslot that is not within the reduced set of timeslots.

2. The method of claim 1, wherein the instruction to monitor the reduced set of timeslots and the negative acknowledgement are received in a single radio block.

3. The method of claim 1, wherein the reduced set of timeslots is identified within a radio link control data block.

4. The method of claim 1, wherein the new data block has not previously been transmitted to the network.

5. A mobile station, comprising:
a processor, the processor being configured to:
receive an assignment of a set of timeslots for uplink communications;
receive an instruction to monitor a reduced set of timeslots, the reduced set of timeslots having a number of timeslots less than a number of timeslots to be monitored in accordance with the assignment;
receive a negative acknowledgement of a data block previously transmitted to a network; and
in response to receiving the instruction to monitor the reduced set of timeslots and receiving the negative acknowledgement, transmit a new data block to the network before retransmitting the data block previously transmitted to the network, wherein the processor is configured to transmit the new data block using a resource on at least one timeslot that corresponds to a timeslot that is not within the reduced set of timeslots.

6. The mobile station of claim 5, wherein the instruction to monitor the reduced set of timeslots and the negative acknowledgement are received in a single radio block.

7. The mobile station of claim 5, wherein the reduced set of timeslots is identified within a radio link control data block.

8. The mobile station of claim 5, wherein the new data block has not previously been transmitted to the network.

9. A method for communicating with a mobile station, comprising:
transmitting, to the mobile station by a network system comprising a processor, an assignment of a set of timeslots for uplink communications;
transmitting, to the mobile station by the network system, an instruction to monitor a reduced set of timeslots, the reduced set of timeslots having a number of timeslots less than a number of timeslots to be monitored in accordance with the assignment; and
responsive to the transmitting of the instruction to monitor the reduced set of timeslots, prioritizing, by the network system, a transmission of a new data block over a transmission of a NACKED data block to the mobile station.

10. The method of claim 9, wherein the NACKED data block comprises a data block that was previously transmitted to the mobile station and for which a negative acknowledgement has been received.

11. A method for communicating with a mobile station, comprising:
transmitting an assignment of a set of timeslots for uplink communications;
transmitting an instruction to monitor a reduced set of timeslots, the reduced set of timeslots having a number of timeslots less than a number of timeslots to be monitored in accordance with the assignment; and
prioritizing a transmission of a new data block over a transmission of a NACKED data block to the mobile station, wherein prioritizing the transmission of the new data block over the transmission of the NACKED data block is performed only once during a single dynamic timeslot reduction period.

12. A network component, comprising:
a processor, the processor being configured to:
transmit an assignment of a set of timeslots for uplink communications;
transmit an instruction to monitor a reduced set of timeslots, the reduced set of timeslots having a number of timeslots less than a number of timeslots to be monitored in accordance with the assignment; and
responsive to the transmitting of the instruction to monitor the reduced set of timeslots, prioritize a transmission of a new data block over a transmission of a NACKED data block to the mobile station.

13. The network component of claim 12, wherein the NACKED data block comprises a data block that was previously transmitted to the mobile station and for which a negative acknowledgement has been received.

14. The network component of claim 12, wherein the processor is configured to prioritize the transmission of the new data block over the transmission of the NACKED data block only once during a single dynamic timeslot reduction period.

* * * * *